INVENTOR.
FREDERIC A. FOSS
BY
Dewey J. Cunningham
ATTORNEY

INVENTOR.
FREDERIC A. FOSS

BY

Dewey J. Cunningham

ATTORNEY

Dec. 27, 1960

F. A. FOSS

CONTROL SYSTEMS 2,966,670

Filed Dec. 17, 1954

7 Sheets-Sheet 3

INVENTOR.
FREDERIC A. FOSS
BY
Dewey J. Cunningham
ATTORNEY

INVENTOR.
FREDERIC A. FOSS
BY
Dewey J. Cunningham
ATTORNEY

CONTROL SYSTEMS

Filed Dec. 17, 1954

INVENTOR.
FREDERIC A. FOSS
BY
Dewey J. Cunningham
ATTORNEY

*INVENTOR.*
FREDERIC A. FOSS
*BY*
Dewey J. Cunningham
ATTORNEY

| DECIMAL HTU | REFLECTED DECIMAL | CONVENTIONAL CODED DECIMAL 2*-4-2-1 H 3210 | T 3210 | U 3210 | REFLECTED CODED DECIMAL 2*-4-2-1 (+9-±7-±3-±1) H 3210 | T 3210 | U 3210 |
|---|---|---|---|---|---|---|---|
| 000 | 000 | 0000 | 0000 | 0000 | 0000 | 0000 | 0000 |
| 001 | 001 | 0000 | 0000 | 0001 | 0000 | 0000 | 0001 |
| 002 | 002 | 0000 | 0000 | 0010 | 0000 | 0000 | 0011 |
| 003 | 003 | 0000 | 0000 | 0011 | 0000 | 0000 | 0010 |
| 004 | 004 | 0000 | 0000 | 0100 | 0000 | 0000 | 0110 |
| 005 | 005 | 0000 | 0000 | 1011 | 0000 | 0000 | 1110 |
| 006 | 006 | 0000 | 0000 | 1100 | 0000 | 0000 | 1010 |
| 007 | 007 | 0000 | 0000 | 1101 | 0000 | 0000 | 1011 |
| 008 | 008 | 0000 | 0000 | 1110 | 0000 | 0000 | 1001 |
| 009 | 009 | 0000 | 0000 | 1111 | 0000 | 0000 | 1000 |
| 010 | 019 | 0000 | 0001 | 0000 | 0000 | 0001 | 1000 |
| 011 | 018 | 0000 | 0001 | 0001 | 0000 | 0001 | 1001 |
| 012 | 017 | 0000 | 0001 | 0010 | 0000 | 0001 | 1011 |
| 013 | 016 | 0000 | 0001 | 0011 | 0000 | 0001 | 1010 |
| 014 | 015 | 0000 | 0001 | 0100 | 0000 | 0001 | 1110 |
| 015 | 014 | 0000 | 0001 | 1011 | 0000 | 0001 | 0110 |
| 016 | 013 | 0000 | 0001 | 1100 | 0000 | 0001 | 0010 |
| 017 | 012 | 0000 | 0001 | 1101 | 0000 | 0001 | 0011 |
| 018 | 011 | 0000 | 0001 | 1110 | 0000 | 0001 | 0001 |
| 019 | 010 | 0000 | 0001 | 1111 | 0000 | 0001 | 0000 |
| 020 | 020 | 0000 | 0010 | 0000 | 0000 | 0011 | 0000 |
| 021 | 021 | 0000 | 0010 | 0001 | 0000 | 0011 | 0001 |
| 022 | 022 | 0000 | 0010 | 0010 | 0000 | 0011 | 0011 |
| 023 | 023 | 0000 | 0010 | 0011 | 0000 | 0011 | 0010 |
| 024 | 024 | 0000 | 0010 | 0100 | 0000 | 0011 | 0110 |
| 095 | 094 | 0000 | 1111 | 1011 | 0000 | 1000 | 0110 |
| 096 | 093 | 0000 | 1111 | 1100 | 0000 | 1000 | 0010 |
| 097 | 092 | 0000 | 1111 | 1101 | 0000 | 1000 | 0011 |
| 098 | 091 | 0000 | 1111 | 1110 | 0000 | 1000 | 0001 |
| 099 | 090 | 0000 | 1111 | 1111 | 0000 | 1000 | 0000 |
| 100 | 190 | 0001 | 0000 | 0000 | 0001 | 1000 | 0000 |
| 101 | 191 | 0001 | 0000 | 0001 | 0001 | 1000 | 0001 |
| 102 | 192 | 0001 | 0000 | 0010 | 0001 | 1000 | 0011 |
| 103 | 193 | 0001 | 0000 | 0011 | 0001 | 1000 | 0010 |
| 104 | 194 | 0001 | 0000 | 0100 | 0001 | 1000 | 0110 |

FIG_11

INVENTOR.
FREDERIC A. FOSS
BY
Dewey J. Cunningham
ATTORNEY

United States Patent Office 2,966,670
Patented Dec. 27, 1960

2,966,670

CONTROL SYSTEMS

Frederic A. Foss, Binghamton, N.Y., assignor to International Business Machines Corporation, New York, N.Y., a corporation of New York Filed Dec. 17, 1954, Ser. No. 475,945

9 Claims. (Cl. 340—347)

The present invention relates to control systems. The invention is particularly concerned with a control system of the closed loop positional servo type which receives an analog voltage input and provides an output in digital form. This digital output may be in a binary or decimal code. Such systems may be used in coupling analog and digital computers so that the latter may be controlled by the former. Another use for the present invention may be in data handling or data recording systems.

In the analog computer field, closed loop positional servo systems are well known. Broadly they include an amplifier which is adapted to receive an analog voltage from which a shaft position is desired. The amplifier output is fed to a motor which is shaft connected to a tachometer. The tachometer output is fed back to the amplifier for damping purposes. The slider of a potentiometer may be shaft connected with the tachometer or motor and arranged so that its output potential may be fed back to the amplifier in opposition to the analog input voltage.

It is often desirable to control the operation of a digital type machine with an analog type output. This output may be in the form of a shaft position which is obtained directly or by the positional servo system described above. It is known that code discs may be utilized for converting from the shaft position to a digital type output. One such device employs a disc having a binary code arranged thereon with brushes being used for reading the code. Thus, for various positions of the code disc, different coded binary outputs can be obtained.

A disadvantage of this arrangement lies in the binary code itself. The same is also true with respect to decimal codes. For example, suppose that the disc is rotating through an angular distance such that the coded output in binary form goes from 001111 to 010000. It is possible that the brush which is reading the next to highest order may read the change from "0" to "1" before the brushes reading the lower order positions read the change from "1" to "0." If this occurred, the reading for this instant would be 011111, which would be an error in reading approximately double the first reading. That is, the output goes from a first value to a second value approximately double the first value, and then to a third value which is only one unit above the first value. Because of these possible ambiguities, it became necessary to stop the code disc in a position where the brushes were all reading from the same line of code. This, of course, slows down the operation considerably.

The digital type machine which utilizes the outputs from the code disc may be one which performs calculations based on the information for controlling another operation. Or, the digital machine may be a punch for making a perforated record in cards or tape.

The present invention is related to this general field and more particularly involves the use of the so-called reflected code. In Patent No. 2,632,058, granted to F. Gray on March 17, 1953, there is described a coded reflected binary numbers system. The reflected binary code has the important property that only one code position changes from "0" to "1," or vice versa, when the decimal equivalent changes by one unit. The reflected binary code can be derived from the conventional binary code by the following equations.

$$R_n=C_n$$
$$R_{n-1}=C_n+C_{n-1}$$
$$R_{n-2}=C_{n-1}+C_{n-2}$$
$$\vdots$$
$$R_2=C_3+C_2$$
$$R_1=C_2+C_1$$
$$R_0=C_1+C_0$$

where $C$=conventional binary number
$R$=reflected binary number
$C_p$=conventional binary number in any position $p$
$R_p$=reflected binary number in any position $p$
$C=C_nC_{n-1}C_{n-2}\ldots C_3C_2C_1C_0$
$R=R_nR_{n-1}R_{n-2}\ldots R_3R_2R_1R_0$
$n$=the highest order position.

In order to convert from the reflected binary code to the conventional binary code the following equations may be used.

$$C_n=R_n$$
$$C_{n-1}=R_n+R_{n-1}$$
$$C_{n-1}=R_n+R_{n-1}+R_{n-2}$$
$$\vdots$$
$$C_2=R_n+R_{n-1}+R_{n-2}+\ldots+R_4+R_3+R_2$$
$$C_1=R_n+R_{n-1}+R_{n-2}+\ldots+R_3+R_2+R_1$$
$$C_0=R_n+R_{n-1}+R_{n-2}+\ldots+R_2+R_1+R_0$$

The algebraic postulates used are as follows:

$$0+0=0$$
$$0+1=1$$
$$1+0=1$$
$$1+1=0$$

It will be seen that because of the fact that only one position changes from "0" to "1," or vice versa, when the decimal equivalent changes by one unit, the reflected binary code may be used in converting from a shaft output to a digital output without stopping the code disc connected to the shaft output. Thus, conversion may take place "on the fly."

I have found that the code reflection concept may be extended to many decimal number systems. In fact, it appears that a number of these coded decimal number systems may be converted to a related reflected coded decimal numbers system according to the translation equations $R_s=C_s+C_{s+1}$ and $$C_s=\sum_{t=s}^{3}R_t$$

where $s$=0, 1, 2, or 3 and indicates a corresponding code position. Reference is made to Fig. 11 which shows a table for the conventional 2*-4-2-1 decimal numbers system. The units, tens and hundreds positions of a series of decimal numbers are shown in the first column. In the next column, the units, tens and hundreds positions of said decimal numbers are shown in a reflected decimal numbers system. It will be noted that the reflected decimal numbers change in only one position for any sequential change of one unit. The conventional 2*-4-2-1 decimal code is shown in the next column. Each of the units, tens and hundreds positions is in the form of a four digit code. The 2*-4-2-1 reflected decimal code is shown in the next column. The coded reflected decimal numbers system changes only one digit at a time, in each position where there is a change, for any sequential change of one unit.

To utilize the coded decimal conversion equations given above and considering one position only, for example the units position, suppose it is desired to convert from the conventional coded decimal number 1101 to its related reflected coded decimal number. The equation $R_s=C_s+C_{s+1}$ may be used as follows where $s=0$, 1, 2 and 3:

$$R_0=C_0+C_{0+1}=1+0=1$$
$$R_1=C_1+C_{1+1}=0+1=1$$
$$R_2=C_2+C_{2+1}=1+1=0$$
$$R_3=C_3=1$$

Thus, the reflected coded decimal number becomes $R_3R_2R_1R_0$ or 1011. To convert back to the coded decimal number, the equation $$C_s=\sum_{t=s}^{3}R_t$$

may be used as follows where $s=0$, 1, 2 and 3:

$$C_0=R_0+R_1+R_2+R_3=1+1+0+1=1$$
$$C_1=R_1+R_2+R_3=1+0+1=0$$
$$C_2=R_2+R_3=0+1=1$$
$$C_3=R_3=1$$

The coded decimal number therefore becomes $C_3C_2C_1C_0$ or 1101.

The present invention makes use of reflected coded binary or decimal numbers systems in a closed loop servo apparatus. With this invention it is possible to convert dynamically from an analog shaft position to a digital output, which is suitable as an input to a digital calculator, in a closed loop servo system.

An object of the present invention, therefore, is to provide an improved closed loop servo system.

Another object of this invention is to furnish an improved closed loop servo system for translating from an analog shaft position to a digital output.

Still another object of the invention is to provide a closed loop servo system from which a dynamic digital readout may be obtained from a shaft position input.

A further object of the present invention is to furnish a novel switching circuit for converting from a reflected coded numbers system to an analog voltage.

Other objects of the invention will be pointed out in the following description and claims and illustrated in the accompanying drawings, which disclose, by way of examples, the principle of the invention and the best mode, which has been contemplated, of applying that principle.

Figure 8:
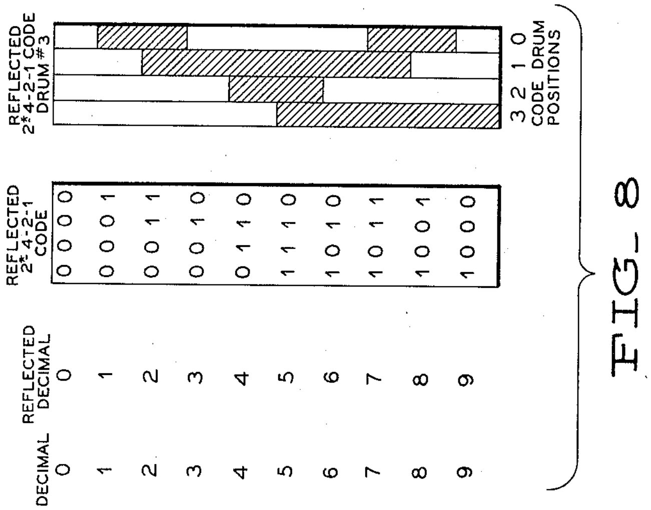
Figure 7:
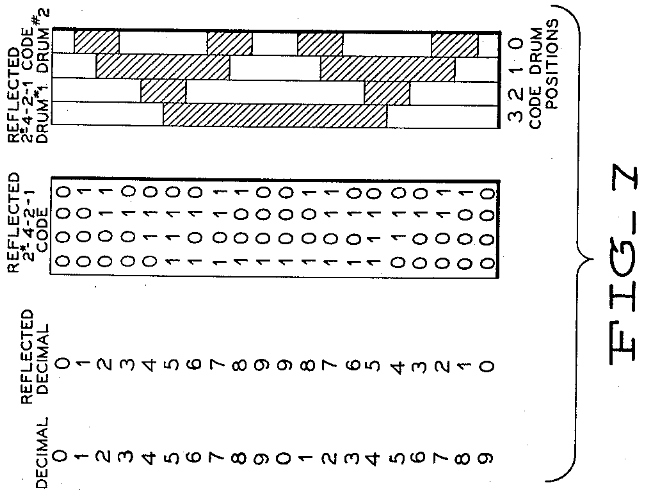
Figure 6A:
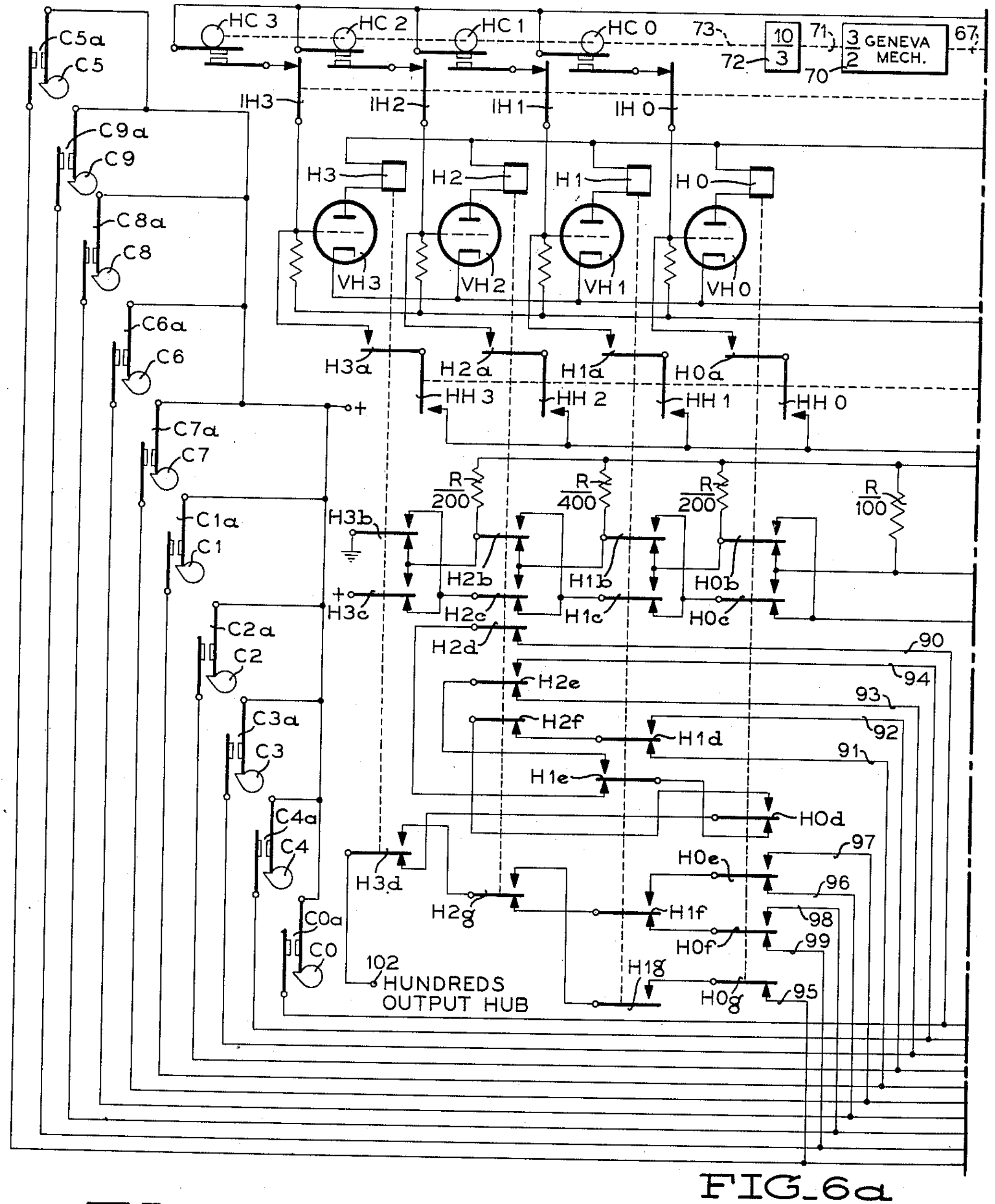
Figure 9:
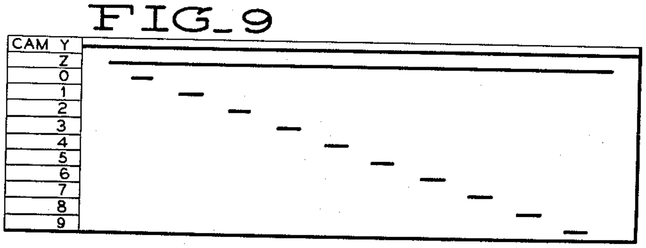
Figure 6B:
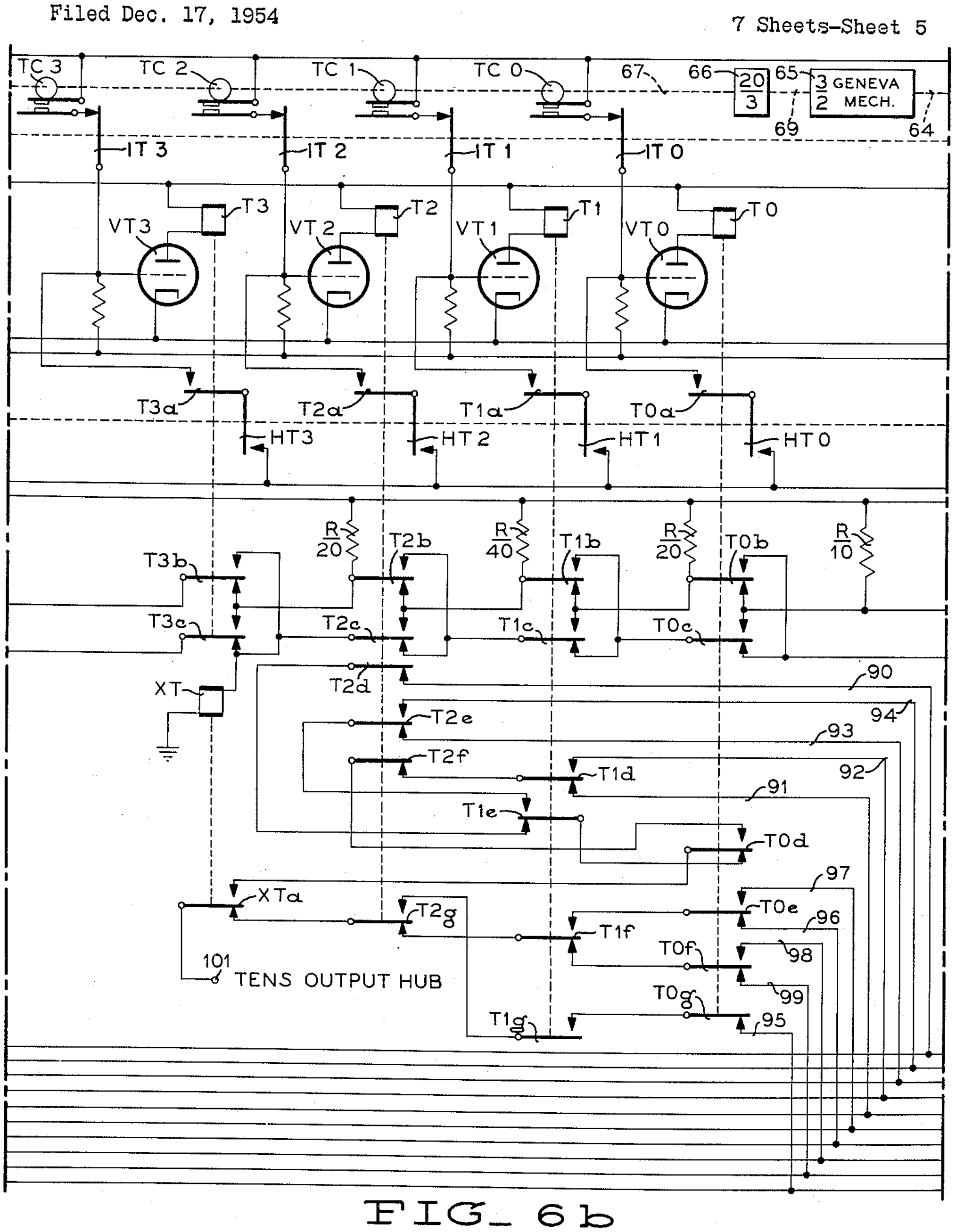
Figure 10:
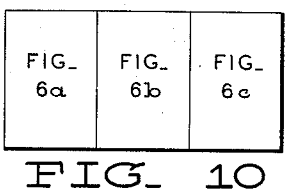
Figure 6C:
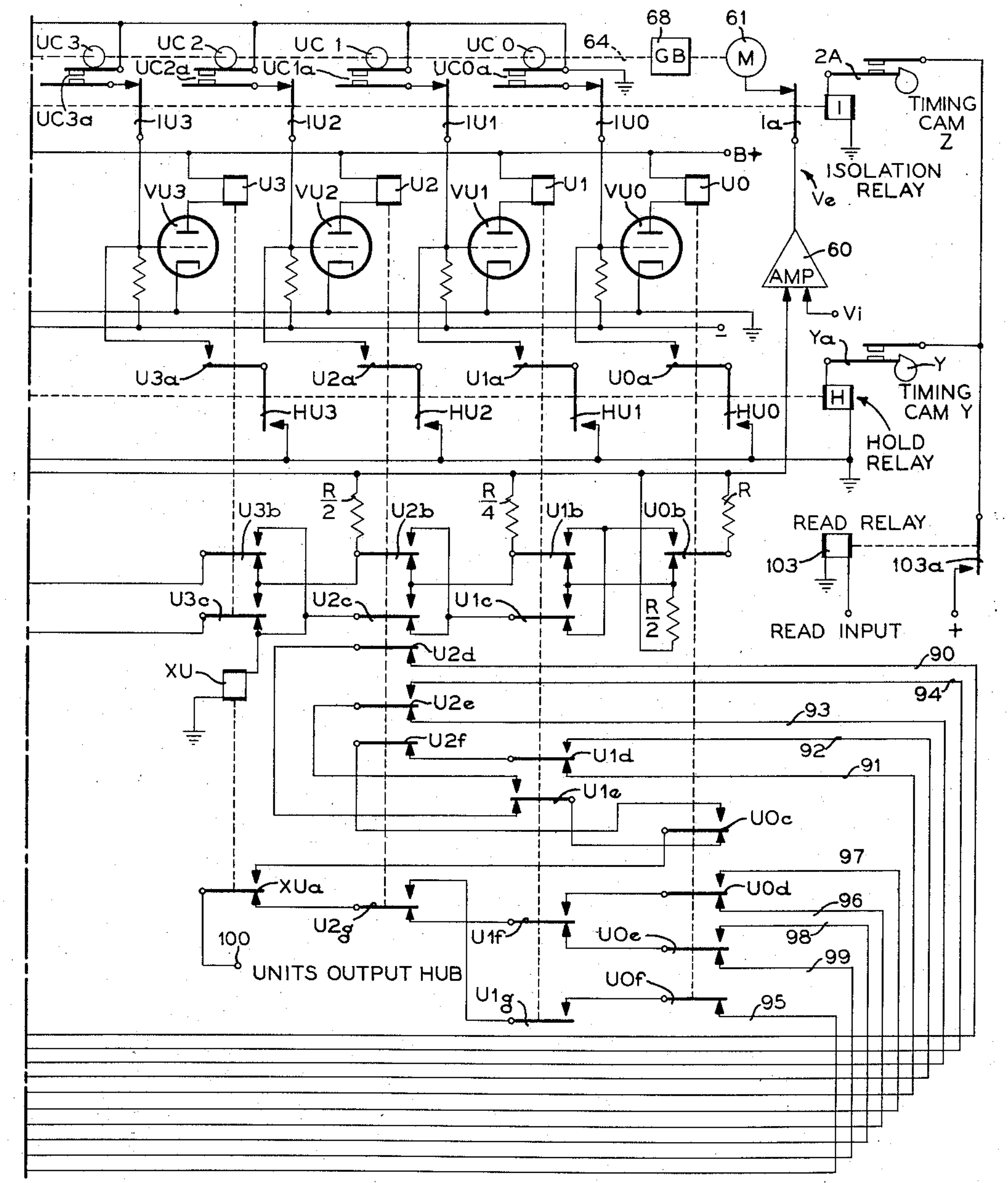

Figs. 6*a*, 6*b* and 6*c* form a schematic diagram of the present invention wherein a reflected coded decimal numbers system is used;

Fig. 7 shows the code pattern which is used on the units and tens positions drums schematically illustrated in Figs. 6*b* and 6*c*, the decimal digits for said positions as well as the coded representation therefor being shown adjacent said pattern;

Fig. 8 shows the code pattern which is used on the hundreds position drum schematically illustrated in Fig. 6*a*, the decimal digits for said position as well as the coded representation therefor being shown adjacent said pattern;

Fig. 9 is a timing chart for a number of the cams shown in Figs. 6*a* and 6*c*;

Fig. 10 is a block diagram showing the manner of combining Figs. 6*a*, 6*b* and 6*c* to form the complete circuit; and Fig. 11 is a chart showing the coded decimal and reflected coded decimal representations of a plurality of numbers.

Similar reference numerals represent similar parts throughout the several views.

Figures 1, 2:
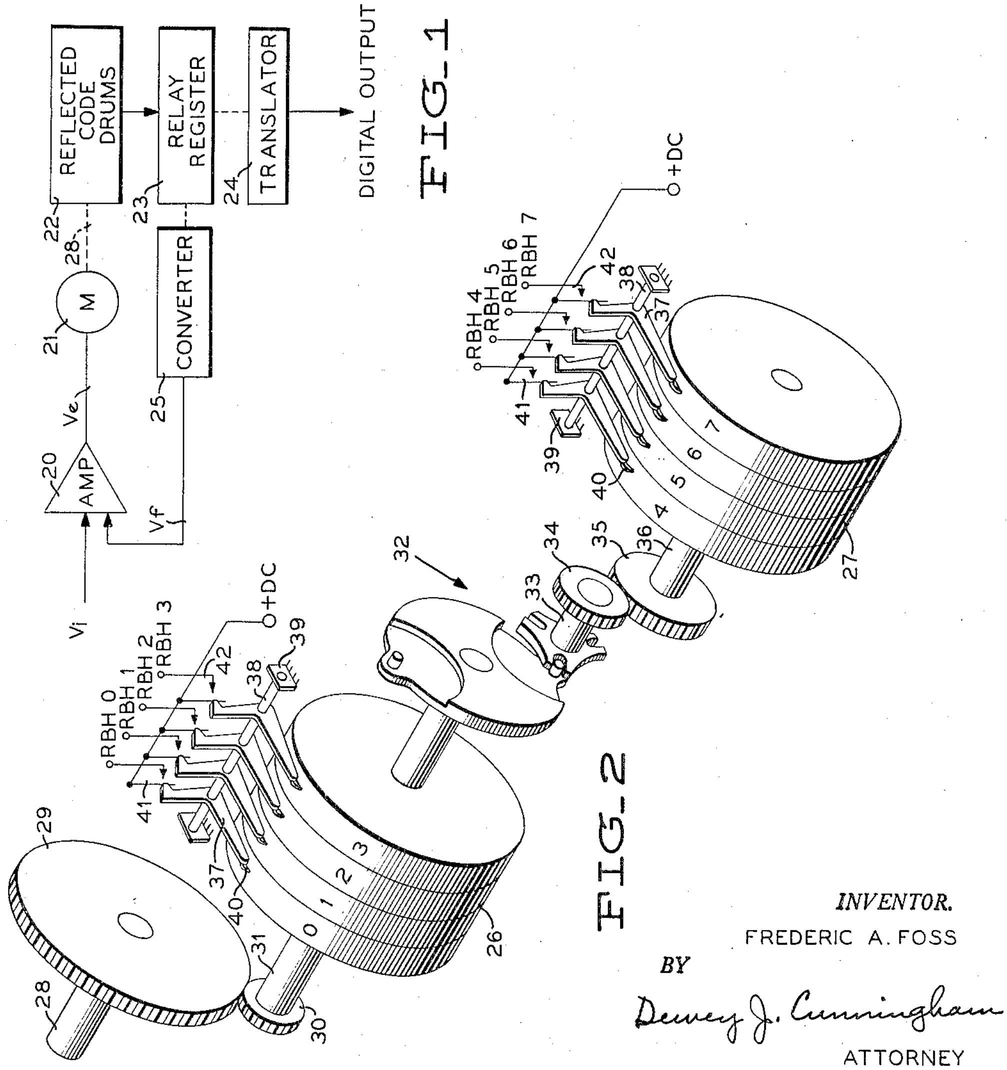
Fig. 1 is a schematic block diagram of the present invention.
Fig. 2 is a diagrammatic representation of the code drums used in converting an analog shaft position into a reflected coded binary signal.

Referring to Fig. 1, an amplifier 20 is provided for receiving an analog voltage input $V_i$. This amplifier is conventional in design and may be of the type usually referred to as a summing or servo amplifier. The amplifier output is a voltage proportional to the servo system error $V_e$ which is connected to the control winding of a reversible electric motor 21. The shaft output of the motor is connected to drive the reflected code drums shown in block form as 22. In this manner a reflected coded number signal is supplied in either a reflected binary or reflected decimal numbers system. The reflected coded number signal is used to control a plurality of relays in a relay register shown in block form and illustrated by reference numeral 23. The translator and converter, shown in block form and illustrated by reference numerals 24 and 25, respectively, are networks including contacts controlled by the relay register 23. The output signal from the translator is digital in form and may be used as an input to appropriate devices capable of utilizing the signal. The output from the converter is an analog voltage $V_f$ which is fed back to amplifier 20. The feedback voltage $V_f$ is in phase opposition to the input voltage $V_i$. When $V_f=V_i$, $V_e=0$ and the system is at a null.

Referring to Fig. 2, there is shown by way of example one way of converting from a shaft position to a reflected coded binary number. Drum 26 has tracks for digit positions 0, 1, 2 and 3 which progress from the lowest order to the highest order of the first four digits of a binary number. Drum 27 has tracks for digit positions 4, 5, 6 and 7 which progress from the lowest order to the highest order of the next four digits of said binary number. Drive for drums may be from motor 21 to the shaft 28, said shaft being coupled by gears 29 and 30 to shaft 31 upon which drum 26 is fixedly mounted.

A Geneva coupling 32 is arranged such that a 120° motion of the Geneva output shaft 33 occurs twice for each revolution of shaft 31. Gears 34 and 35 are secured to shafts 33 and 36, respectively, and are of such dimensions that a gearing ratio of 3:16 is provided between shaft 33 and shaft 36. Drum 27 is mounted on shaft 36 for rotation therewith.

Figure 3:
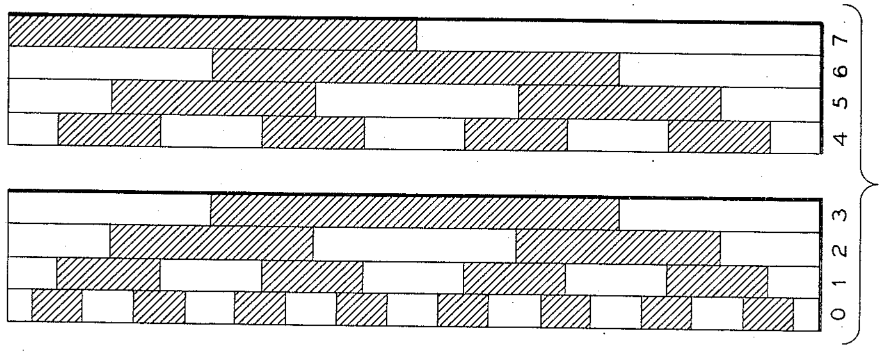
Fig. 3 shows the coded pattern used on the code drums of Fig. 2.

The coding on the surfaces of drums 26 and 27 is shown in Fig. 3. Drum tracks 0 through 7 are arranged in the manner shown in columns 0 through 7 of Fig. 3, the shaded areas representing raised areas on the drum surfaces.

In order to sense the data on the drums a plurality of sensing fingers 37 is furnished for each of drums 26 and 27, said fingers being pivotally mounted on a shaft 38 which is secured to a frame member 39. The end of each finger adjacent the drum surface is provided with a tip 40 which assures accurate following of the drum surface. The other end of each finger serves to operate a movable contact 41. Each movable contact has associated therewith a fixed contact 42. A +D.C. voltage is applied to all of contacts 41. The closing of contacts 41 from each of tracks 0 through 7 provides a positive potential at each of hubs RBH0, RBH1, RBH2, RBH3, RBH4, RBH5, RBH6 and RBH7, respectively. The letters RBH stand for reflected binary hub, and the digit associated with the letters indicates the digit position in the reflected binary code.

For example, if hubs RBH0, RBH2, RBH3, RBH6 and RBH7 had positive potentials thereon at a particular instant, the reflected coded binary number represented would be 11001101, the lowest order or zero position being at the right end of the sequence and the highest order being at the left end of the sequence.

Figure 4:
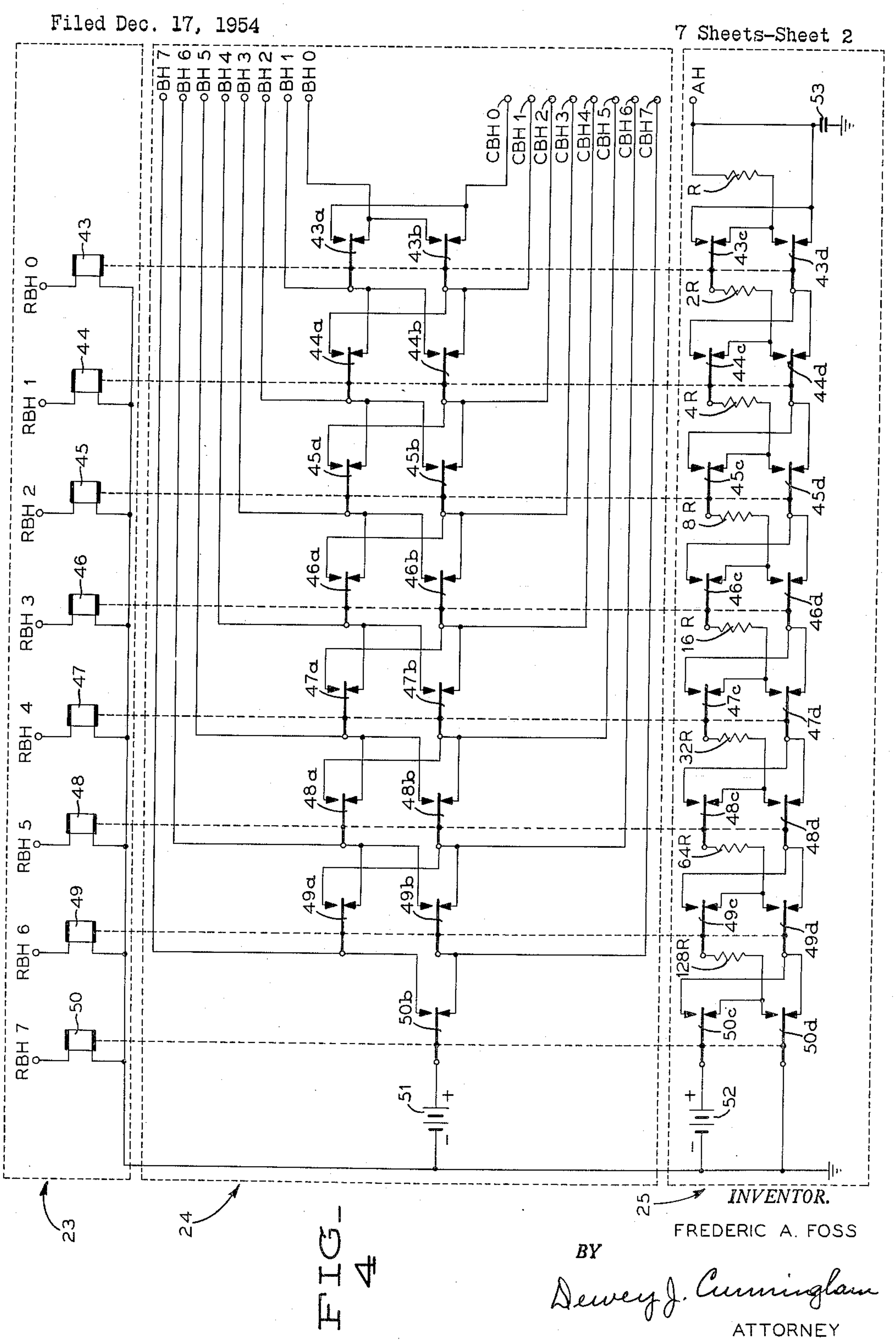
Fig. 4 is a schematic diagram of the relay register and translator used in translating the reflected coded binary signal obtained from the apparatus of Fig. 2 to coded binary and coded binary complement signals and in converting said reflected coded binary signal to an analog voltage.

Referring to Fig. 4, the details of relay register 23, translator 24 and converter 25 are shown. The relay register comprises a plurality of relays illustrated by reference numerals 43, 44, 45, 46, 47, 48, 49 and 50, said relays having one terminal connected to points RBH0 through RBH7, respectively, and another terminal connected to ground potential. The arrangement is such that the existence of a potential on any of hubs RBH0 through RBH7 will energize the relay associated therewith.

Relays 43 through 50 each have four movable contacts which may be designated by the number of the relay and a suffix *a*, *b*, *c* or *d*. For example, relay 43 controls movable contacts 43*a*, 43*b*, 43*c* and 43*d*. Since the *a* contact of relay 50 is not used in this circuit it is not shown in the drawing. Each of the movable contacts is adapted to move between and engage a pair of fixed contacts which will be distinguished herein only as upper or lower contacts. When a relay is not energized its movable contacts will be in engagement with the lower fixed contact. This may be termed a normal condition. When a relay is energized, its movable contacts engage the upper fixed contacts.

Referring to the translator 24, a battery 51 has the low side thereof connected to ground and the high side connected to movable contact 50*b*. The upper and lower fixed contacts associated with movable contact 50*b* are connected to movable contacts 49*a* and 49*b*, respectively. The remainder of the translator network from this point on is a "shifting down" symmetric network. The upper and lower fixed contacts associated with the *a* movable contact of one position are connected to the *b* and *a* movable contacts, respectively, of the next lower order position while the upper and lower fixed contacts associated with the *b* movable contact of one position are connected to the *a* and *b* movable contacts, respectively, of the next lower order position.

In order to obtain the conventional coded binary number output from the translator, a plurality of hubs BH1 through BH7 are connected to movable contacts 43*a* through 49*a*, respectively. The BH0 hub is connected to the lower and upper fixed contacts associated with movable contacts 43*a* and 43*b*, respectively. The letters BH are intended to stand for "binary hub" and the numeral following the letters indicates the digit position or order.

In order to obtain the complement of the conventional coded binary number, a plurality of hubs CBH1 through CBH7 are connected to movable contacts 43*b* through 49*b*, respectively. The CBH0 hub is connected to the upper and lower fixed contacts associated with movable contacts 43*a* and 43*b*, respectively. The letters CBH indicate a complement binary hub and the digit following the letters designates the digit position or order.

Referring to the converter 25, a battery 52 has its low side connected to ground and its high side connected to movable contact 50*c*. The upper and lower fixed contacts associated with movable contacts 50*c* and 50*d*, respectively, are connected directly to movable contact 49*d*. However, the lower and upper fixed contacts associated with movable contacts 50*c* and 50*d*, respectively, are connected through a resistor 128R to movable contact 49*c*, the number 128 representing the multiplying factor for a given value of resistance R. The interposition coupling is similar for the remaining positions except that the multiplying factor decreases by one-half in each successively decreasing order, i.e., 64R, 32R, 16R, 8R, 4R and 2R. The lower and upper fixed contacts associated with movable contacts 43*c* and 43*d*, respectively, are connected through resistor R to hub AH while the upper and lower fixed contacts associated with movable contacts 43*c* and 43*d*, respectively, are also connected to hub AH, said hub being connected to ground through a capacitor 53. This capacitor is utilized to provide a short circuit path for spurious A.C. signals. The letters AH designate the analog voltage output hub. It should be noted that the impedance of any resistor is chosen as $2^nR$ where $n$ is the corresponding code position and R is the value of the resistor in the zero code position.

The operation of the invention thus far described will now be explained. When an input voltage $V_i$ is fed to amplifier 20, $V_e$ is as always equal to $V_i - V_f$. Motor 21 immediately begins running at a rate proportional to the voltage $V_e$ and in a direction dependent on the polarity of $V_e$. Motor 21 drives drums 26 and 27 through the gearing previously described so that sequential reflected coded binary numbers appear at hubs RBH0 through RBH7 as a group. For purposes of explanation, assume that at a particular instant the reflected coded binary number 10100101 exists at the hubs. This means that relays 43, 45, 48 and 50 will be energized so as to transfer the movable contacts associated therewith from the lower to the upper fixed contacts. With this condition set up, hubs BH1, BH2, BH6 and BH7 will be at the same potential as the high side of battery 51. Thus, the conventional binary number 11000110 appears at hubs BH0 through BH7. It can be determined that this is an accurate translation by making the translation using the equations recited hereinabove. The complement coded binary number on hubs CBH0 through CBH7 becomes 00111001. Both the conventional coded binary and complement conventional coded binary outputs from the translator may be utilized in various types of computing machines as previously described.

As the translator is supplying the conventional coded binary signals and the complement thereof, converter 25 supplies an analog voltage proportional to the decimal equivalent of said coded binary signals to terminal AH. For instance, with the example chosen above, i.e., where the reflected coded binary input is 10100101, the path from the high side of battery 52 to ground potential is through contacts 50*c*, 49*d* and 48*d*, resistor 32R, contact 47*c*, resistor 16R, contact 46*c*, resistor 8R, contacts 45*c*, 44*d* and 43*d*, resistor R, contact 43*c*, resistor 2R, contact 44*c*, resistor 4R, contacts 45*d*, 46*d*, 47*d* and 48*c*, resistor 64R, contact 49*c*, resistor 128R and contact 50*d*. The resistance between the high side of the battery and terminal AH is 32R+16R+8R+R=57R. The resistance between the terminal AH and ground is 2R+4R+64R+128R=198R. The voltage at hub AH therefore becomes $$E_b - E_b \cdot \frac{57R}{57R+198R} = E_b - E_b \cdot \frac{57R}{255R}$$

where $E_b$ is equal to the voltage of battery 52. If, for the sake of convenience, $E_b$ is made equal to 25.5 volts and R is made equal to 1 ohm, the voltage at hub SH becomes $$25.5 - 25.5 \cdot \frac{57}{255} = 25.5 - 5.7 = 19.8 \text{ volts}$$

The voltage at hub AH is fed back to the input of amplifier 20 where it is summed with $V_i$ to produce a new $V_e$. Thus, there is provided a closed loop servo system for converting an analog voltage input to a digital output in a coded binary numbers system for use in appropriate digital calculating apparatus.

The converter shown in Fig. 4 is one in which the battery always sees a constant impedance and any load connected to terminal AH sees a variable impedance. Under certain circumstances it may be desirable to have the load see a constant impedance. The converter circuit of Fig. 5 does provide a constant impedance for the load to look into. The arrangement of relay operated contacts, their associated fixed contacts is identical with converter 25 in Fig. 4 except that a normally open contact on 43*c* and a normally closed contact on 43*d* are not required. However, instead of the resistors being all connected in series, they are now connected in parallel. One end of each of resistors R/128, R/64, R/32, R/16, R/8, R/4 and R/2 is connected to contacts 49*c*, 48*c*, 47*c*, 46*c*, 45*c*, 44*c* and 43*c*, respectively. One end of R is connected through a capacitor 53 to ground. The other end of each of the resistors is connected to hub AH. Battery 52 is now arranged between contacts 50*c* and 50*d* with the low side thereof being connected to ground.

Figure 5:
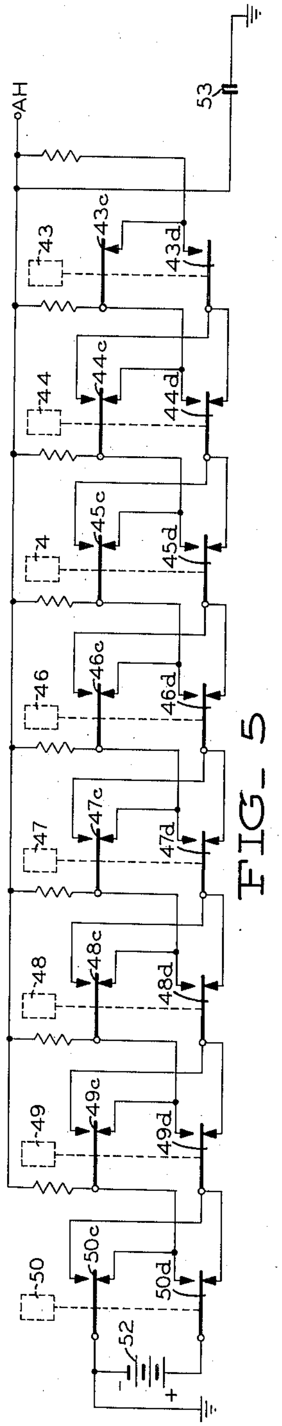
Fig. 5 is a modification of the converter circuit included in Fig. 4.

For the example given above, the voltage at terminal AH will be the same in the circuit shown in Fig. 5 as that shown in Fig. 4. The circuit between the high side of the battery and terminal AH includes resistors R/128, R/64, R/4 and R/2 in parallel, making a total resistance of R/198. The remainder of the circuit, i.e., from the hub AH to the low side of the line, includes resistors R, R/8, R/16 and R/32 in parallel, making a total resistance of R/57. Since the two total resistances are in series, the total circuit resistance becomes $$R/198+R/57=\frac{255R}{11286}$$

Therefore, the voltage at hub AH becomes $$25.5-25.5\cdot\frac{R/198}{255R/11286}=25.5-25.5\cdot\frac{R}{198}\cdot\frac{11286}{255R}$$

$$=25.5-25.5\cdot\frac{57}{255}=25.5-5.7=19.8 \text{ volts}$$

Reference is now made to Figs. 6*a*, 6*b* and 6*c* which, when combined as shown in block form in Fig. 10, shows the use of the present invention in a coded decimal numbers system. It should be pointed out that generally the circuitry associated with the units position code drum is shown in Fig. 6*c* while the circuitry associated with the tens and hundreds positions is shown in Figs. 6*b* and 6*a*, respectively.

As shown in Fig. 6*c*, the voltage input $V_i$ is applied to a summing amplifier 60, the output of which is connected to a reversible motor 61 through the contact I*a*, said contact being controlled by an isolation relay I. The means for converting the motor shaft position into a reflected coded terminal number is shown schematically herein as a plurality of cam operated contacts controlled by motor 61. Code cams UC0, UC1, UC2 and UC3 are mounted on shaft 64 which is driven through a gear reduction train 68 by motor 61. The letters UC designate units cams and the numeral associated with the letters indicates the digit position within the order.

A Geneva mechanism 65, which may be identical with Geneva mechanism 32 in Fig. 2, provides a 3:2 intermittent reduction in shaft rotation to shaft 69 from shaft 64. Gear train 66 furnishes a 20:3 speed reduction to shaft 67 from shaft 69. The total effect of these reductions is that shaft 67 makes one revolution while shaft 64 is making ten revolutions. Code cams TC0, TC1, TC2 and TC3 are mounted on shaft 67, the letters TC standing for the tens cams and the numerals associated with the letters indicating the digit position.

A Geneva mechanism 70, which may also be identical with Geneva mechanism 32 in Fig. 2, provides a 3:2 intermittent reduction in shaft rotation to shaft 71 from shaft 67. Gear train 72 furnishes a 10:3 speed reduction to shaft 73 from shaft 71. The total effect of these reductions is that shaft 73 makes one revolution for every five revolutions of shaft 67. Code cams HC0, HC1, HC2 and HC3 are mounted on shaft 73.

It should be made clear at this point that while the units, tens and hundreds orders contact operating means are shown schematically, they may in fact be similar to the structure shown in Fig. 2. In other words, there may be a units order drum having tracks 0, 1, 2 and 3 coded as shown in Fig. 7. The tens order drum would be identical with the units order drum. The hundreds order drum would be coded in accordance with Fig. 8. It should also be pointed out that various forms of code discs may be used for generating the same reflected coded decimal signals which are to be generated by the UC, HC and TC code cams.

Since the relay switching arrangement for the units and tens orders are identical, and since the hundreds order differs only to a small degree from the units and tens orders, a description will be given of the units order switching arrangement only. The differences found in the hundreds order arrangement will be explained thereafter.

It will be noted that each of cams U0 through U3 controls a pair of normally open contacts UC0*a* through UC3*a*. The closure of one of contacts UC0*a* through UC3*a* applies a potential through one of the normally closed isolation relay contacts IU0 through IU3, respectively, to the control grid of one of thermionic device VU0 through VU3, respectively. Appropriate grid resistors are used to connect the control grid of each thermionic device to a negative bias potential. Relays U0, U1, U2 and U3 are arranged in conventional manner between the plates of thermionic devices VU0 through VU3, respectively, and a suitable B+ potential source. Since the operation of each of the thermionic devices is quite conventional, it is only necessary to state that each device is normally biased off by the negative bias potential. When ground potential is connected to the control grid the plate potential drops below B+ and the relay in the plate circuit is energized.

Each of relays U0 through U3 controls a number of transfer contacts. These transfer contacts are referenced with the designation of the relay with which they are associated plus an alphabetic character. For example, relay U0 controls the condition of transfer contacts U0*a* through U0*f*.

The ground potential which is connected at times to the control grids of thermionic devices VU0 through VU3 is also connected through a normally open point associated with contacts U0*a* through U3*a* to contacts associated with hold relay H. For the units order, these contacts are designated HU0, HU1, HU2 and HU3 and are connected to contacts U0*a*, U1*a*, U2*a* and U3*a*, respectively. Each of these hold relay contacts are associated with a normally open point which is connected directly to ground potential.

As will be more apparent at a later point in the description, the hold relay contacts assure that all of relays U0 through U3 which are energized at the beginning of a reading operation continue to stay energized throughout the operation.

The converter apparatus is similar to that for the coded binary numbers system in that it is a "shifting down" symmetric network. In the units order, the zero position includes transfer contact U0*b* which is connected through resistor R to the feedback line to amplifier 60. Normally open and normally closed fixed contacts are associated with transfer contact U0*b* and are connected to the normally open and normally closed fixed contacts, respectively, associated with transfer switch U1*b*, as well as the normally closed and normally open contacts, respectively, associated with transfer contact U1*c*. A resistance R/2 is connected between the normally closed contacts associated with transfer contacts U0*b* and U1*b* and the feedback line. Transfer contact U1*b* is connected through a resistance R/4 to the feedback line, as well as being connected directly to the normally closed and normally open contacts associated with transfer contacts U2*b* and U2*c*, respectively. Transfer contact U1*c* is connected to the normally open and normally closed contacts associated with transfer contacts U2*b* and U2*c*, respectively. Transfer contact U2*b* is connected to the feedback line through resistance R/2 and to the normally closed and normally open contacts associated with transfer contacts U3*b* and U3*c*, respectively. Transfer contact U2*c* is connected to the normally open and normally closed contacts associated with transfer contacts U3*b* and U3*c*, respectively.

Referring to Figs. 6*a*, 6*b* and 6*c*, it will be noted that the "3" position of the units order is connected to the "0" position of the tens order in the same manner in which the "2" position is connected to the "3" position of the units order. In other words, the switching arrangement is symmetric from the "0" position of the units order to the "3" position of the hundreds order. Relative to the hundreds order, transfer contact H3*b* is connected to ground and H3*c* is connected to a source of positive potential. It should also be pointed out that the resistances used in the tens order from the "0" to "3" positions are one-tenth the value of the resistances in the "0" to "3" positions of the units order. The resistances used in the hundreds order from the "0" to "3" positions are one-tenth the value of the resistances in the "0" to "3" positions of the tens order.

The translation circuit shown below the converter circuit translates the reflected coded decimal input and translates it into output signals during a read time into a three-digit number. For example, if the reflected coded decimal input at the beginning of a read time is 0001 1000 0010, the output during the read time will be the decimal 103.

In order to accomplish the above translation, the appropriate contacts are transferred at the beginning of a read time, and thereafter each of the units, tens and hundreds translating networks are rippled to detect the presence of digits 0 through 9 therein. Referring to Fig. 6*a*, cams C0, C1, C2, C3, C4, C5, C6, C7, C8 and C9 are shown positioned to transfer normally open contacts C0*a*, C1*a*, C2*a*, C3*a*, C4*a*, C5*a*, C6*a*, C7*a*, C8*a* and C9*a*, respectively. The transfer of the contacts C0*a* through C9*a* takes place sequentially as illustrated in the timing chart shown in Fig. 9. Since all of the transfer contacts C0*a* through C9*a* are commoned and connected to a positive source of potential, the successive transfer of contacts C0*a* through C9*a* applies potential successively to consecutively numbered lines 90 through 99, respectively. The reference numerals for lines 90 through 99 have been chosen such that the lowest order digit of the reference number represents the digit which is being searched for in each network.

Before describing the details of the translation network reference should be made to the equations previously listed for converting from a reflected coded decimal numbers system to a coded decimal numbers system. If the correct units order coded decimal number is to be determined, it is necessary to look at the hundreds and tens order coded decimal numbers. The units order coded decimal number is translated as its true value if the hundreds and tens order coded decimal numbers are both odd or both even. The units order coded decimal number is translated as its nines complement if the hundreds and tens order coded decimal numbers are even and odd, respectively, or vice versa. It follows that in order to determine the correct tens order coded decimal number, it is necessary to look at the hundreds order coded decimal number. The tens order coded decimal number is translated as its true value or as its nines complement of the hundreds order coded decimal number is even or odd, respectively. Since the present embodiment is only concerned with the units, tens and hundreds orders, the thousands order coded decimal number is always considered to be 0000. The given code structure is such that inversion of the $C_3$ position produces the nines complement value. In determining the $C_3$ position in the hundreds order, it will be the same as $R_3$. In determining the $C_3$ position in the tens order it is necessary to determine if the coded decimal number in the hundreds order is even or odd. If the hundreds order is even, i.e., 1010, 1111, 0110, etc., then $C_3$ in the tens order is identical with $R_3$. However, if the hundreds order is odd, i.e., 1000, 1110, 0010, etc., then $C_3$ is the opposite of $R_3$. The same determination must be made relative to odd or even in the hundreds and tens order so that the $C_3$ position in the units order can be determined.

In the present translation network, the determination of odd or even relative to all higher orders is obtained from the converter network. Referring to Fig. 6*b*, relay XT has one of its terminals connected to the normally open and normally closed points associated with transfer contacts T3*b* and T3*c*, respectively, and the other of its terminals connected to ground. Relay XT is known as the tens translation relay and controls transfer contact XT*a*. As shown in Fig. 6*c*, relay XU has one of its terminals connected to the normally open and normally closed points associated with transfer contacts U3*b* and U3*c*, respectively, and the other of its terminals connected to ground. Relay XU is known as the units translation relay and controls transfer contact XU*a*. It will be apparent that it is not necessary to have a hundreds translation relay since the thousands order is always considered to be even.

Referring specifically to the units order translator shown in Fig. 6*c*, the units output hub 100 connects to the units translation transfer contact XU*a* which has a normally open and a normally closed contact point associated therewith. The normally closed point connects to transfer contact U2*g* whose normally closed and normally open points connect directly to transfer contacts U1*f* and U1*g*, respectively. Contact U1*g* connects through its normally open point to transfer contact U0*f*, the normally closed point associated with the last-named contact being connected to line 95. The normally closed point associated with U1*f* connects through U0*e* and its normally closed point to line 99. The normally open point of U0*e* is connected to line 98. The normally open point associated with U1*f* connects through U0*d* and its normally closed point to line 96. The normally open point of U0*d* is connected to line 97.

The normally open point of XU*a* is connected to U0*c*. The normally closed point of U0*c* connects through U1*e* and its normally closed point to U2*d*, the normally closed point for U2*d* being connected to line 90. The normally open point associated with U0*c* connects with U2*f* which, through its normally closed contact connects with U1*d*. The normally closed and normally open points associated with transfer contact U1*d* connect to lines 91 and 92, respectively. The normally open point associated with U1*e* connects through U2*e* and its normally closed point to line 93. The normally open point associated with U2*e* is connected to line 94.

The tens order translating network shown in Fig. 6*b* is similar to the units order translating network. The hundreds order translating network differs from the units and tens orders networks only in that it does not have a translating relay. Note that contact H3*d* is in the same position in the hundreds order network as XU*a* and XT*a* in the units and tens orders networks, respectively, but is controlled directly by the reflected coded input for the "3" position in the hundreds order. This is possible since $C_3=R_3$ in the hundreds order in the instant embodiment. The tens and hundreds orders hubs are illustrated by reference numerals 101 and 102, respectively.

The operation of the circuit shown in Figs. 6*a*, 6*b* and 6*c* will be explained by use of a typical example. It should be understood that from an over-all standpoint input potential $V_1$ to amplifier 60 is summed with the feedback potential from the converter circuit, which is in opposition thereto, to produce the error signal $V_e$. The error signal drives motor 61 which turns the code drums shown schematically herein as a plurality of cams, These cams or code drums, if rotating, continuously set up new reflected coded decimal numbers in the relay register provided the isolation relay I is not energized. However, the isolation relay is only energized during a read cycle. The reading frequency is independent of the frequency of reflected coded decimal number change. The latter varies as a function of the error signal $V_e$ while the former is normally a constant. The constant is so chosen that a proper response time will be obtained with the closed loop servo.

A reading cycle takes place upon the application of a read input signal to read relay 103. This causes contact 103*a* to be connected to the normally open point associated therewith, said point being connected to a positive source of potential. The transfer of contact 103*a* makes the normally open points associated with contacts Y*a* and Z*a* also at said positive potential. As seen in Fig. 9 cam Y makes for an entire read cycle. This energizes relay H which transfers all of the hold contacts HU0 through HH3. This causes the number in the relay register at the beginning of the read input to remain unchanged for the remainder of the input. For example, suppose the code drums were positioned to place the reflected coded decimal number 0001 1000 0010 in the relay register which comprises relays U0 through H3. The operation of cam Y would energize the hold relay H and transfer the contacts associated therewith. Shortly thereafter, cam Z transfers contact Z*a* and energizes the isolation relay I which opens the circuit between the code drums and the relay register. However, the relay register is held through the transfer points of relay H. During the read time the analog voltage output from the converter would remain constant. The translator would be conditioned with contacts H0*d* through H0*g* and U1*d* through U1*g* transferred. Since contacts H0*b*, H0*c*, T3*b* and T3*c* in the converter are also transferred the path through the remainder of the converter is such that relays XT and XU are energized to transfer contacts XT*a* and XU*a*, respectively.

Shortly after cam Z operates to isolate the code drums from relays U0 through H3, cams C0 through C9 sequentially transfer contacts C0*a* through C9*a*, respectively, and interrogate the path from lines 90 through 99, respectively, to the units, tens and hundreds output hubs. Only one complete path will be found in each of the units, tens and hundreds orders translators. In the units order shown in Fig. 6*c*, the path from line 93 is completed to the units output hub 100, when contact C3*a* transfers, through contacts U2*e*, U1*e*, U0*c* and XU*a*. Thus, the units order digit is "3." In the tens order shown in Fig. 6*b*, the path from line 90 is completed to the tens output hub 101, when contact C0*a* transfers, through contacts T2*d*, T1*e*, T0*d* and XT*a*. Thus, the tens order digit is "0." In the hundreds order shown in Fig. 6*a*, the path from line 91 is completed to the hundreds output hub 102, when contact C1*a* transfers, through contacts H1*d*, H2*f*, H0*d* and H3*d*. Thus, the hundreds order digit becomes "1." The entire decimal output number is "103." A check with Fig. 11 will show that the translation is correct.

It will be appreciated that the converter feeds back to amplifier 60 a continuous voltage. This voltage varies as a function of $V_e$. In fact it follows $V_e$ quite closely, taking into consideration the response time for the closed loop, except during read time when the feedback voltage is a constant. However, as soon as the read cycle is completed, the code drums set up the contacts in the converter to produce the proper feedback voltage. The read input signal to relay 103, Fig. 6*c*, would normally come from the apparatus receiving the decimal output or the apparatus supplying the input signal $V_i$. The voltage $V_i$ may be produced in a number of ways, all of which are well known in the servo control field.

From the above detailed description it will be seen that I have provided a closed loop servo system which utilizes a reflected binary or a reflected decimal numbers system in a manner to change analog input data into digital output data, the arrangement being such that possible ambiguities between the coded numbers are kept to a minimum.

While there have been shown and described and pointed out the fundamental novel features of the invention are applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A closed loop servo system comprising amplifier means arranged to receive a data input signal and a feedback signal which is in opposition to said input signal, said amplifier providing an error signal as an output therefrom, rotatable encoding means responsive to said error output signal for providing coded output signals representing a multiposition number in a reflected binary code, said encoding means being varied as a function of said error signal, multipositioned data manifesting means responsive to said reflected binary coded output signals, separate first and second switching means associated with each position of said data manifesting means and directly controlled thereby in accordance with the reflected binary manifested data, a separate resistance associated with said first and second switching means in each position, an output terminal, input terminals for applying a potential to said switching means and said resistances, said first and second switching means of all positions serving to interconnect all of said resistances so as to provide a potential at said output terminal which is indicative of the numerical magnitude of the reflected binary code manifested data, said output terminal being further connected to said amplifier so as to provide said feedback signal thereto.

2. A closed loop servo system as defined in claim 1 in which all of said resistances are interconnected in series, said input terminals are directly connected to the first and second switching means in one of said positions and said output terminal is directly connected to the resistance in another of said positions.

3. A closed loop servo system as defined in claim 1 in which said input terminals are directly connected to the first and second switching means in one of said positions, and in which one end of each resistance in each position is directly connected to said output terminal.

4. A closed loop servo system comprising amplifier means arranged to receive a data input signal and a feedback signal which is in opposition to said input signal, said amplifier providing an error signal as an output therefrom, rotatable encoding means responsive to said error output signal for providing coded output signals representing a multiposition number in a reflected binary code, said encoding means being varied as a function of said error signal, multiposition data manifesting means responsive to said reflected binary coded output signals, separate first and second switching means associated with each position of said data manifesting means and directly controlled thereby in accordance with the reflected binary manifested data, means connecting together the first and second switching means in adjacent positions, input terminals connected to the first and second switching means of one of said positions for applying a potential thereto, an output terminal, a separate resistance associated with each of said positions, means connecting one end of each said resistance to the switching means of its associated position, means directly connecting the other end of each said resistance to said output terminal, all of said first and second switching means and all of said resistances being so interconnected as to provide a potential at said output terminal which is indicative of the numerical magnitude of the reflected binary coded manifested data, and means connecting said output terminal to said amplifier so as to provide said feedback signal thereto.

5. A system according to claim 4 in which the value of each resistance in said positions is one half of the value of the resistance in the next lower adjacent position.

6. A system according to claim 4 in which the coded output signals from said rotatable encoding means are associated together in decimal groups corresponding to the decimal orders of a number, said positions being likewise associated together in decimal groups, and in which the value of each resistance in the positions forming a group is one tenth of the value of the resistance in a corresponding position in the next lower adjacent group.

7. A system for converting a sequence of *n* position signals representing a number according to a reflected binary coded numbers system to analog voltages representative thereof, comprising first and second switching means for each position of said number directly controlled by the reflected binary signal of its associated position, a separate resistance associated with each of said positions having one end thereof connected to the first and second switching means therein, input terminals for connection to a source of potential which are connected to the first and second switching means in one of said positions, an output terminal, means connecting the other end of each of said resistances to said output terminal, and means connecting together the first and second switching means in adjacent positions.

8. A system according to claim 7 in which the value of each resistance in said positions is one half the value of the resistance in the next lower adjacent position.

9. A system according to claim 7 in which said positions are associated together in decimal groups corresponding to the decimal orders of a number, and in which the value of each resistance in the positions forming a group is one tenth of the value of the resistance in a corresponding position in the next lower adjacent group.

References Cited in the file of this patent

UNITED STATES PATENTS

| | | |
|---|---|---|
| 2,537,498 | Wickesser | Jan. 9, 1951 |
| 2,538,615 | Carbrey | Jan. 16, 1951 |
| 2,685,084 | Lippel | July 27, 1954 |
| 2,692,814 | Malhes | Oct. 26, 1954 |
| 2,704,353 | Alkan | Mar. 15, 1955 |
| 2,738,504 | Gray | Mar. 13, 1956 |
| 2,782,408 | Fisher et al. | Feb. 19, 1957 |
| 2,852,764 | Frothingham | Sept. 16, 1958 |

OTHER REFERENCES

"Coding by Feedback Methods," I. R. E. Proceedings, August 1953, pp. 1053–1058.